(12) United States Patent
Sheard et al.

(10) Patent No.: US 8,102,424 B2
(45) Date of Patent: Jan. 24, 2012

(54) ERGONOMIC CONFIGURATIONS FOR THERMAL IMAGING CAMERAS

(75) Inventors: Justin M. Sheard, Rogers, MN (US); Joseph V. Ferrante, Redmond, WA (US); Peter A. Bergstrom, St. Paul, MN (US); Kirk R. Johnson, Rogers, MN (US); Christopher W. Lagerberg, Seattle, WA (US); Ferdinand Y. Laurino, Seattle, WA (US); Michael E. Loukusa, Buffalo, MN (US)

(73) Assignee: Fluke Corporation, Everett, WA (US)

( * ) Notice: Subject to any disclaimer, the term of this patent is extended or adjusted under 35 U.S.C. 154(b) by 893 days.

(21) Appl. No.: 11/873,699

(22) Filed: Oct. 17, 2007

(65) Prior Publication Data

US 2009/0102925 A1    Apr. 23, 2009

(51) Int. Cl.
*H04N 5/33* (2006.01)

(52) U.S. Cl. ........ 348/164; 348/373; 348/374; 348/375; 396/419; 396/423; 396/424

(58) Field of Classification Search .................... 348/164
See application file for complete search history.

(56) References Cited

U.S. PATENT DOCUMENTS

| D196,201 S | 9/1963 | Hertzler |
|---|---|---|
| D205,914 S | 10/1966 | Levin |
| D207,811 S | 5/1967 | Bjorn |
| 4,005,605 A | 2/1977 | Michael |
| 4,097,133 A * | 6/1978 | Stemme et al. ............... 352/243 |
| 4,634,294 A | 1/1987 | Christol et al. |
| D317,414 S | 6/1991 | Lanci et al. |
| D321,487 S | 11/1991 | Manno |
| D348,276 S | 6/1994 | Hastings |
| D445,817 S | 7/2001 | Okuley |
| 6,319,199 B1 | 11/2001 | Sheehan et al. |
| 6,440,084 B1 | 8/2002 | Gentempo et al. |
| D464,666 S | 10/2002 | Salapow et al. |
| 6,486,473 B2 | 11/2002 | Salapow et al. |
| D466,540 S | 12/2002 | Lannestedt et al. |
| D487,577 S | 3/2004 | Sheard et al. |
| 6,798,587 B2 | 9/2004 | Irani |
| D525,640 S | 7/2006 | Bloch et al. |
| 7,157,705 B2 | 1/2007 | Hamrelius et al. |
| D540,838 S * | 4/2007 | Aronsson et al. ............ D16/206 |

(Continued)

OTHER PUBLICATIONS

"FLIR Systems Launches BCAM SD Infrared Camera for Building Applications", press release by FLIR Systems, Feb. 16, 2007.*

(Continued)

*Primary Examiner* — Jason Chan
*Assistant Examiner* — Yih-Sien Kao
(74) *Attorney, Agent, or Firm* — Fredrikson & Byron, P.A.

(57) ABSTRACT

A housing of a thermal imaging camera includes a camera portion, in which an thermal imaging assembly is mounted, and to which a focusing assembly is mounted, on a first side thereof, and to which a display is mounted, on a second side thereof; a handle portion of the housing extends from a bottom side of the camera portion of the housing at an angle, away from the first side of the camera portion. The housing is configured for ergonomic handling wherein an index finger of a hand may readily activate the focusing assembly, when the hand is wrapped about the handle portion of the housing. The hand may be a right hand or a left hand, and the camera may further include additional features to provide support for single-handed operation.

37 Claims, 5 Drawing Sheets

U.S. PATENT DOCUMENTS

| | | | |
|---|---|---|---|
| 7,541,581 B2 * | 6/2009 | Reed et al. | 250/330 |
| 7,622,716 B2 * | 11/2009 | King | 250/330 |
| 2006/0249679 A1 | 11/2006 | Johnson et al. | |

OTHER PUBLICATIONS

Mikron Infrared, Inc., M7800 Economical, Fully Radiometric, Hand-Held Thermal Imager with Visual Camera, Datasheet, Rev. 032007, Hancock, MI.

Fluke Corporation, Fluke IR InSight Thermal Imagers, Brochure, Jun. 2006 (2694809 D-EN-N Rev A).

Fluke Corporation, Fluke TiR Series Thermal Imagers, Brochure, Jul. 2006 (2694792 D-EN-N Rev A).

FLIR Systems, ThermaCAM BCAM SD, Brochure from website: http://www.flirthermography.com/cameras/infrared_camera_complete/1106/, date pulled from website: Aug. 29, 2007.

FLIR Systems, BCAM Your Building Inspector, Brochure from website: http://www.flirthermography.com/cameras/infrared_camera_complete/1091/, date pulled from website: Aug. 29, 2007.

Fluke Corporation, Fluke Ti20 Thermal Imager, Brochure from website: http://us.fluke.com/usen/products/features.htm?cs_id=35635(FlukeProducts)&category_T, 1995-2007 Fluke Corporation, date pulled from website: Aug. 29, 2007.

Fluke Corporation, Fluke Ti30 Thermal Imager, Brochure from website: http://us.fluke.com/usen/products/features.htm?cs_id=34645(FlukeProducts)&category_T, 1995-2007 Fluke Corporation, date pulled from website: Aug. 29, 2007.

Brochure, FLIR b-Series, b-Series InfraRed Cameras With on board Visual Camera, Picture-in-Picture Fusion, and Bright LED Lights, www.flir.com/thermography, Rev. 606/25/10-R1, Copyright (c) 2010.

* cited by examiner

ERGONOMIC CONFIGURATIONS FOR THERMAL IMAGING CAMERAS

TECHNICAL FIELD

The present disclosure pertains to thermal imaging cameras and more particularly to configurations thereof for handheld operation.

BACKGROUND

Handheld thermal imaging cameras, for example, including microbolometer detectors to generate infrared images, are used in a variety of applications, which include the inspection of buildings and industrial equipment. Many state-of-the-art thermal imaging cameras have a relatively large amount of built-in functionality allowing a user to select a display from among a host of display options, so that the user may maximize his 'real time', or on site, comprehension of the thermal information collected by the camera. However, in some situations, the user of such a camera is not able to take full advantage of the increased functionality of the camera, for example, when one of the user's hands must be used to stabilize the user at the inspection site and is not available to help hold and/or operate the camera. Thus there is a need for new ergonomic configurations for thermal imaging cameras.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the invention.

Figure 1A:
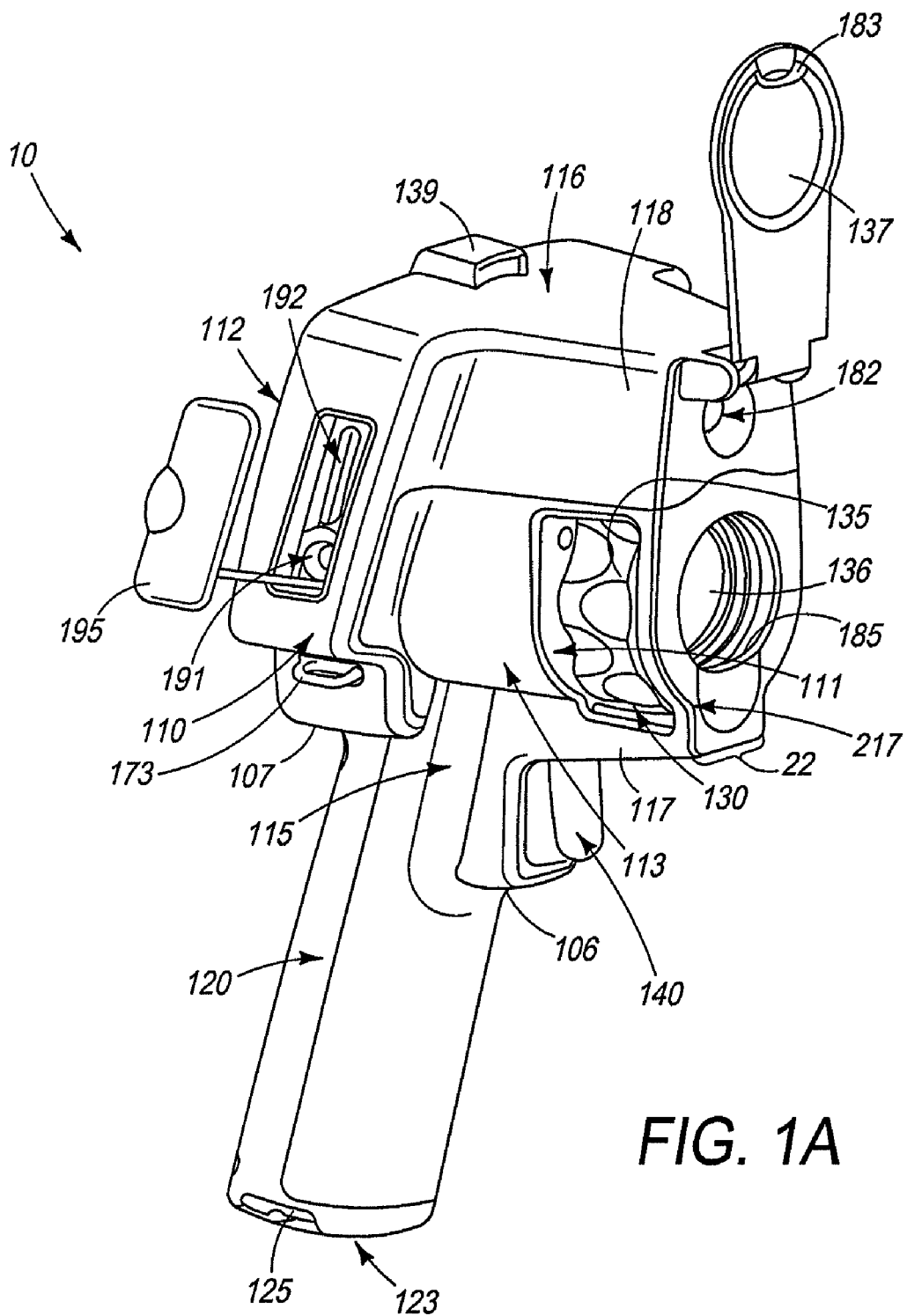
FIG. 1A is a front perspective view of a thermal imaging camera, according to some embodiments of the present invention.
Figure 1C:
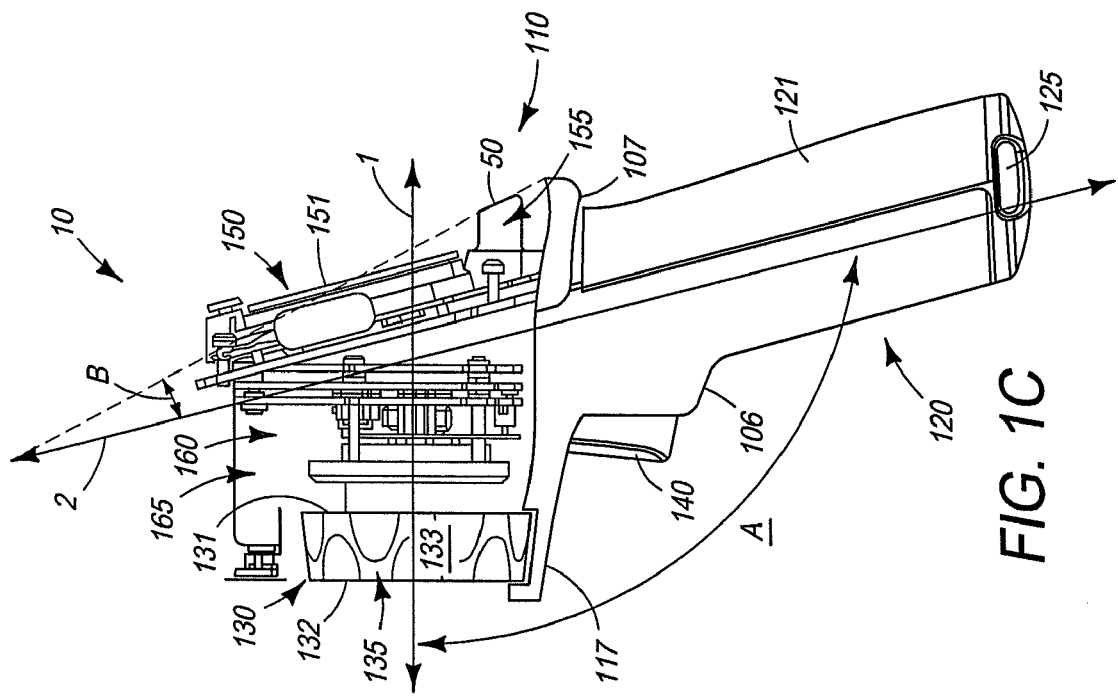
FIG. 1C is a side elevation view of the camera shown in FIG. 1B, according to some embodiments, with portions of a housing of the camera removed.
Figure 1B:
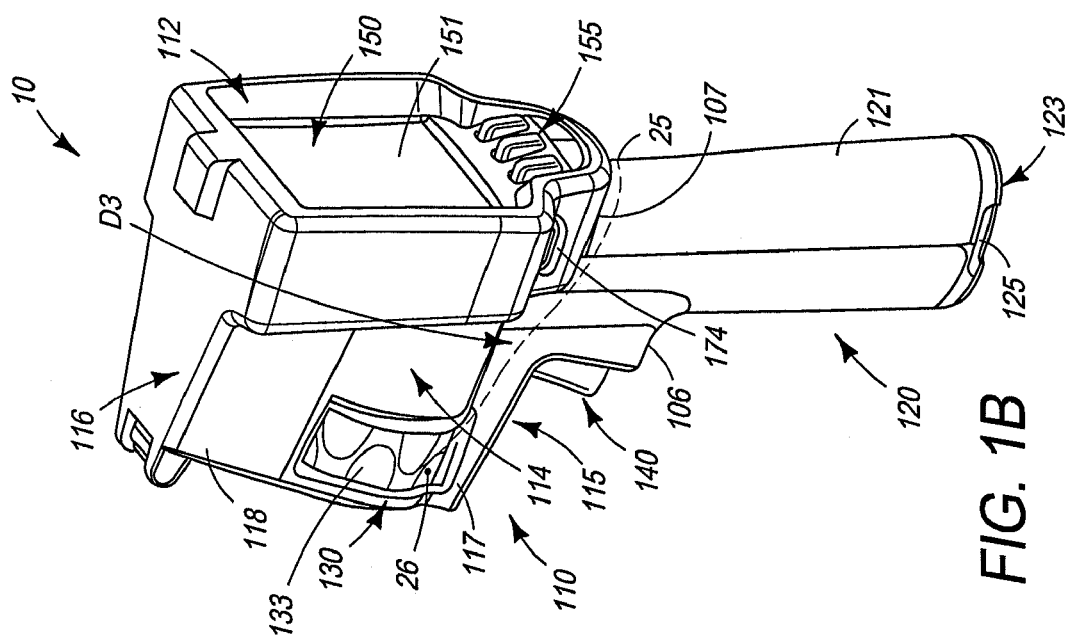
FIG. 1B is a rear perspective view of the camera shown in FIG. 1A, according to some embodiments.

FIGS. 1A-B are front and rear perspective views, respectively, of a thermal imaging camera 10, according to some embodiments of the present invention. FIGS. 1A-B illustrate a housing of camera 10, which housing, for example, formed from one or more injection molded, hard plastic parts, provides an ergonomic user interface for various members of camera 10 that lend structural support to all the elements necessary to capture both infrared and visible light images. A camera portion 110 of the housing is shown including a first side 111, a second side 112, which is opposite first side 111, a third side 113, a fourth side 114, which is opposite third side 113, a bottom side 115 and a top side 116; and, a handle portion 120 of the housing is shown extending to a terminal end 123 thereof, from bottom side 115 of camera portion 110, and at an angle (angle A, FIG. 1C) away from first side 111 of camera portion 110. FIGS. 1A-B further illustrate a focusing assembly 130, which is mounted to first side 111 of camera portion 110 of the housing, a trigger 140 for image capture, which is mounted to the housing beneath focusing assembly 130, being recessed from first side 111 of camera portion 110 of the housing, and a display 150 along with a display control member 155, which are mounted to second side 112 of camera portion 110 of the housing.

According to the illustrated embodiment, both focusing assembly 130 and trigger 140 are located with respect to display control member 155 so that, when either a left hand or a right hand is wrapped about handle portion 120 of the housing, an index finger of the hand may reach to activate either focusing assembly 130 or trigger 140 to capture an image, while a thumb of the hand is positioned to activate display control member 155. With further reference to FIGS. 1A-B, it should be appreciated that, when either the right or left hand is wrapped as such, another finger of either hand, for example, either a middle finger or a ring finger, abuts a first shoulder 106 of the housing, which is shown extending under first side 111 of camera portion 110, just beneath trigger 140, between camera portion 110 and handle portion 120, and an area of the hand between the thumb and the index finger abuts a second shoulder 107 of the housing, which is shown extending under second side 112 of camera portion 110, between camera portion 110 and handle portion 120.

FIG. 1C is a side elevation view of camera 10, according to some embodiments, with portions of the housing removed. FIG. 1C illustrates a first axis 1, along which camera portion 110 of the housing extends, and a second axis 2, which extends at an angle A, with respect to first axis 1, and along which handle portion 120 of the housing extends, away from first side 111 of camera portion 110. According to some preferred embodiments, angle A is approximately 105 degrees, an angle which facilitates a natural orientation of the hand, when wrapped about handle portion 120, for positioning of the fingers, as described above, and for simultaneous viewing of display 150. A viewing surface 151 of display 150 may extend approximately parallel to second axis, in order to facilitate viewing of display 150 when the hand is wrapped about handle portion 120, and a surface 50 of display control member 155 may extend at an angle B with respect to second axis 2, as shown, in order to facilitate depression of member 155 with the thumb of the hand, which is wrapped about handle portion 120.

FIG. 1C further illustrates a thermal imaging assembly 160 mounted within camera portion 110 of the housing, and a visible-light camera module 165 mounted above imaging assembly 160, within an upper projecting sidewall 118 (FIGS. 1A-B) of camera portion 110 of the housing, such that an optical axis thereof is approximately parallel with an optical axis of imaging assembly 160, which approximately coincides with axis 1. Upper sidewall 118 is shown extending from first side 111 of camera portion 110 of the housing and over, and, preferably, beyond focusing assembly 135, in proximity to top side 116 camera portion 110. According to the illustrated embodiment, the arrangement of elements of imaging assembly 160 and visible-light camera module 165 are such that a center of gravity of camera 10 is located in proximity to axis 2, between trigger 140 and second shoulder 107 of the housing. Shoulders 106, 107 are located to provide 'touch points' for the hand of the user, which is wrapped about handle portion 120, for example, as described above, so that the location of the center of gravity and shoulders 106, 107, along with the angling of handle portion 120, can help to balance the camera in a single hand of the user.

Imaging assembly 160 incorporates those elements, known to those skilled in the art, that are typically necessary for thermal imaging, such as a thermal sensor assembly, for example, a microbolometer thermal detector, a lens assembly and a printed circuit board assembly, for example, including one or more signal processors. Visible-light camera module 165 includes similar elements, the sensor assembly of which may be either CMOS or CCD type for digitally capturing images. Some exemplary arrangements of infrared imaging assembly elements and visible-light camera elements, which may be employed by embodiments of the present invention, are described in commonly assigned U.S. Patent Application Publication No. US 2006/0249679; portions of the detailed description of the '679 reference, which are associated with FIGS. 3-5, 7 and 8, are hereby incorporated by reference. It should be noted that handle portion 120 of the housing contains a power source, for example, a rechargeable battery, which may be charged via an AC adapter terminal 191, which is shown recessed alongside a memory card slot 192 within camera portion 110 of housing for enclosure via a removable cover 195.

With reference to FIG. 1A in conjunction with FIG. 1C, it may be appreciated that focusing assembly 130 includes a ring 135 mounted around a lens 136, and that ring 135 includes an exterior surface 133 extending from a first edge 131, located in proximity to first side 111 of camera portion 110 of the housing, to a second edge 132 of ring 135, wherein surface 133 forms an interface for the index finger to activate focusing assembly 130 by rotating ring 135 to move lens 136 back and forth along axis 1. According to the illustrated embodiment, depressions sized to accommodate a tip of an index finger are formed along surface 133.

Figure 1E:
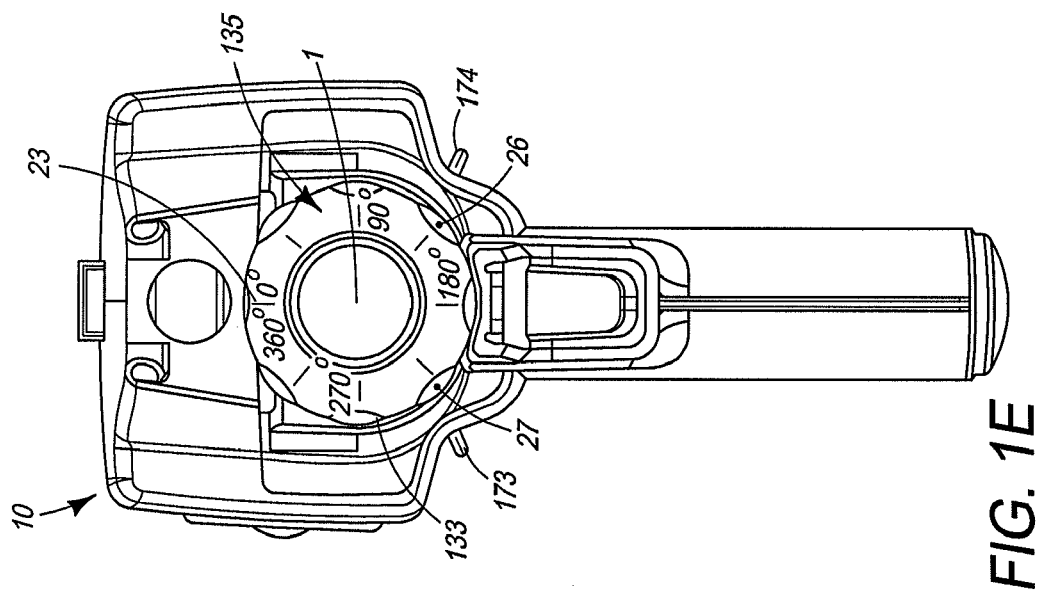
FIG. 1E is front elevation view of the camera shown in FIG. 1B, with some portions of the housing removed, according to some embodiments.
Figure 1D:
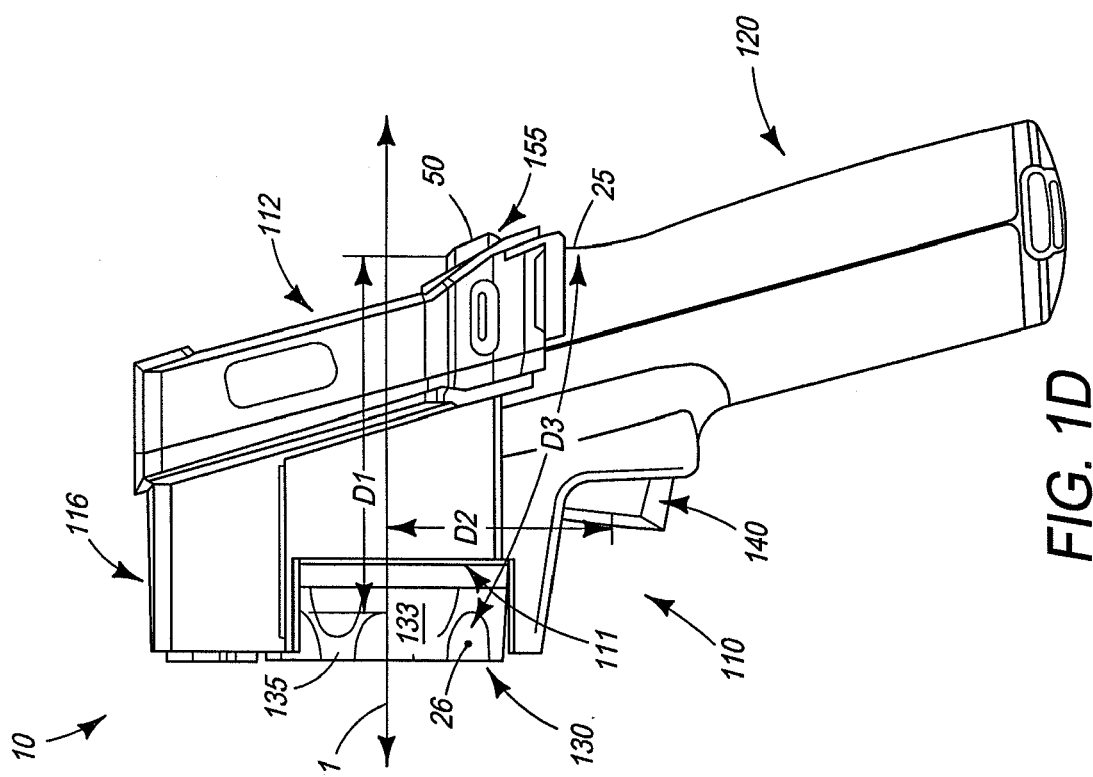
FIG. 1D is the same side elevation view of FIG. 1C, with some of the removed housing portions replaced.

Referring now to FIGS. 1D-E, and with reference back to FIG. 1B, exemplary locations of focusing assembly 130, trigger 140 and display control member 155, which facilitate one-handed operation, will be defined. FIG. 1D is the same side elevation view of camera 10, as that shown in FIG. 1C, with some of the removed housing portions replaced; and FIG. 1E is a front elevation view of camera 10, with some housing portions removed. FIG. 1D illustrates focusing assembly 130 located at a first distance D1 from display control member 155, wherein first distance D1 is along first axis 1 and may be between approximately two inches and approximately four inches. FIG. 1D further illustrates first axis 1 coinciding with a centerline axis of focusing assembly 130, and trigger 140 located at a second distance D2 from first axis 1, wherein second distance D2 is along a line approximately orthogonal to first axis 1 and may be between approximately two inches and approximately three inches. FIG. 1E illustrates surface 133 of focusing assembly ring 135 extending from a top point 23, 3600 around axis 1, and divided into four sectors generally defined between 0° and 90°, between 90° and 180°, between 180° and 270°, and between 270° and 0°. With reference to FIGS. 1B and 1D, a distance D3 which wraps over a surface of the housing from a midpoint 25 of handle portion 120, located just beneath shoulder 107, to a point 26 on ring 135, located in the sector between 90° and 180°, is of a length corresponding to a comfortable reach of an index finger to adjust the focus of camera 10, when the hand of the index finger is wrapped about handle portion 120, for example, as illustrated in FIG. 3A. According to some preferred embodiments of the present invention, distance D3 is no greater than 4.5 inches, which length limitation should accommodate approximately 95% of the hands of the normal adult population. Distance D3 may be measured from the length a string which is wrapped over the surface of the housing, for example, as depicted by the dashed line in FIG. 1B. With further reference to FIG. 1E, it should be appreciated that, due to the symmetry of the housing of camera 10, the same distance D3 exists along the opposite side from point 25 to a point 27 which is located on ring 135 in the sector between 180° and 270°.

Figure 2:
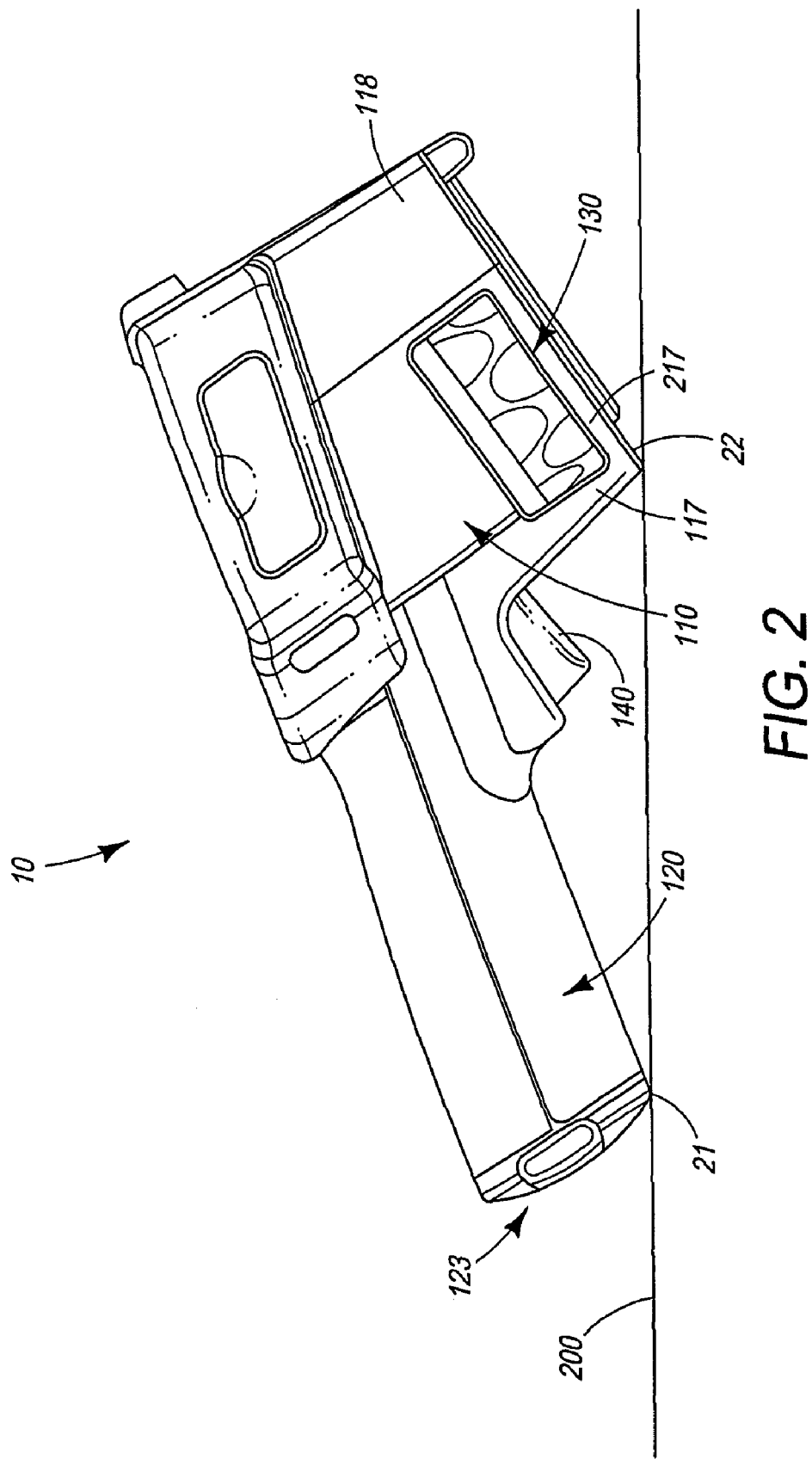
FIG. 2 is a side view of the camera, shown in FIGS. 1A-D, resting on a surface, according to some embodiments.

FIG. 2 is a side view of camera 10 resting on a relatively flat surface 200, according to some embodiments. FIG. 2 illustrates the camera housing further including a first resting edge 21 and a second resting edge 22, which edges 21, 22 form a resting base, or interface, for camera 10 against surface 200. First resting edge 21 of the housing is a portion of a perimeter of terminal end 123 of handle portion 120 of the housing, and second resting edge 22 is a corner edge of a projecting sidewall 117 of the housing, which projecting sidewall 117 extends from first side 111 of camera portion 110 of the housing, between focusing assembly 130 and trigger 140. FIG. 2 further illustrates projecting sidewall 117 including a frontal extension 217, which extension 217 extends over second edge 132 of ring 135 to meet with upper projecting sidewall 118. With reference back to FIG. 1A in conjunction with FIG. 2, it may be appreciated that each of projecting sidewall 117, frontal extension 217 and upper sidewall 118 enclose a portion of ring 135 to provide protection for focusing assembly 130, without hampering access to ring surface 133 from either side 113, 114 of camera portion 110 of the housing, thus allowing for either right- or left-handed activation of focusing assembly 130. Although the illustrated combination of projecting sidewall 117, frontal extension 217 and upper sidewall 118 are preferred, alternate embodiments of the present invention may only include one or both of sidewalls 117, 118 extending beyond ring 135 to protect focusing assembly 130.

With reference back to FIGS. 1A-B, operation of camera 10, according to some methods, will now be described in conjunction with the schematics shown in FIGS. 3A-B. FIG. 1A illustrates a lens cap 137, which is pivotably mounted to the housing of camera 10 and is opened to expose an aperture 182, for the visible light camera, and lens 136, for the infrared camera, which lens 136 is moveable for focusing, via a ring 135 of focusing assembly 130, as previously described. Lens cap 137 is shown coupled to upper sidewall 118, and may be flipped back toward second side 112 of camera portion 110 of the housing and secured in an open position, for example, via a reversible snap fit, by a feature 139 of upper sidewall 118, which feature 139 is shown located in proximity to second side 112 of camera portion 110 of the housing. Lens cap 137 is also shown including a projection 183 to mate, for example, via a reversible snap fit, with another feature 185 of the housing, which is formed as a recess in frontal extension 217, in order to secure cap 137 in a closed position over both aperture 182 and lens 136. FIG. 1B illustrates display 150 including a viewing surface 151, and display control member 155 including a plurality of buttons. According to some preferred embodiments of the present invention, the buttons of display control member 155 provide for all display adjustments and each button of control member 155 is operated via a thumb T of a hand 300 which is wrapped about handle portion 120 of the housing to hold the camera, for example, in the gripping position illustrated in FIGS. 3A-B.

After camera 10 has been turned on and lens cap 137 flipped open, an index finger I of hand 300, which is wrapped about handle portion 120 of the housing of camera 10, may reach to ring 135 in order to focus camera 10. Feature 139 of upper sidewall 118 may be used as a sight to help aim camera 10. According to the schematics of FIGS. 3A-B, once camera 10 is focused, a middle finger M of hand 300 may reach to activate trigger 140, in order to capture an image, while index finger I remains ready to re-focus, if necessary. Although not shown, it should be understood that the grip of hand 300 may be shifted downward per arrow Y (FIG. 3A) so that middle finger M abuts shoulder 106, rather than a ring finger R of hand 300; in this case, index finger I may move from focusing assembly ring 135, after focusing, in order to reach down and activate trigger 140. Once an image is captured, thumb T may activate any of the buttons of display control member 155, to either save or cancel the captured image, which the user sees on viewing surface 151 of display 150. Thumb T may further activate display control member 155 in order to select from a variety of display options, either prior to, or just after, capturing an image. According to some embodiments, activating display control member 155 causes on-screen menus to appear on viewing interface, either alongside or overlaying the captured image, in order to increase the functionality of display control member 155.

Figure 3B:
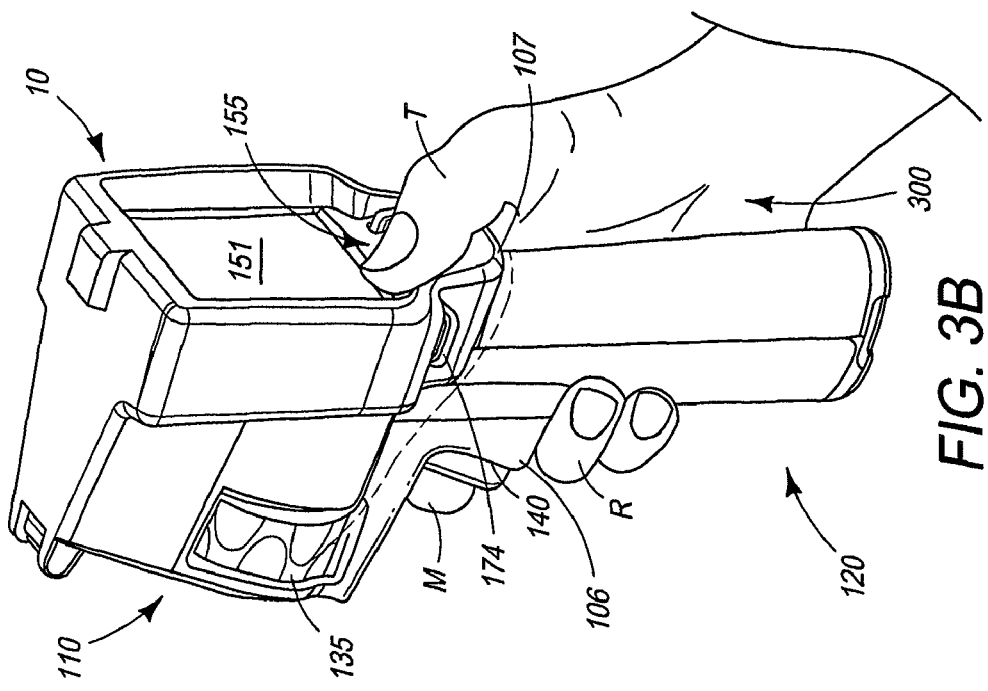
FIGS. 3A-B are schematics depicting single handed operation of a thermal imaging camera, according to some embodiments of the present invention.
Figure 3A:
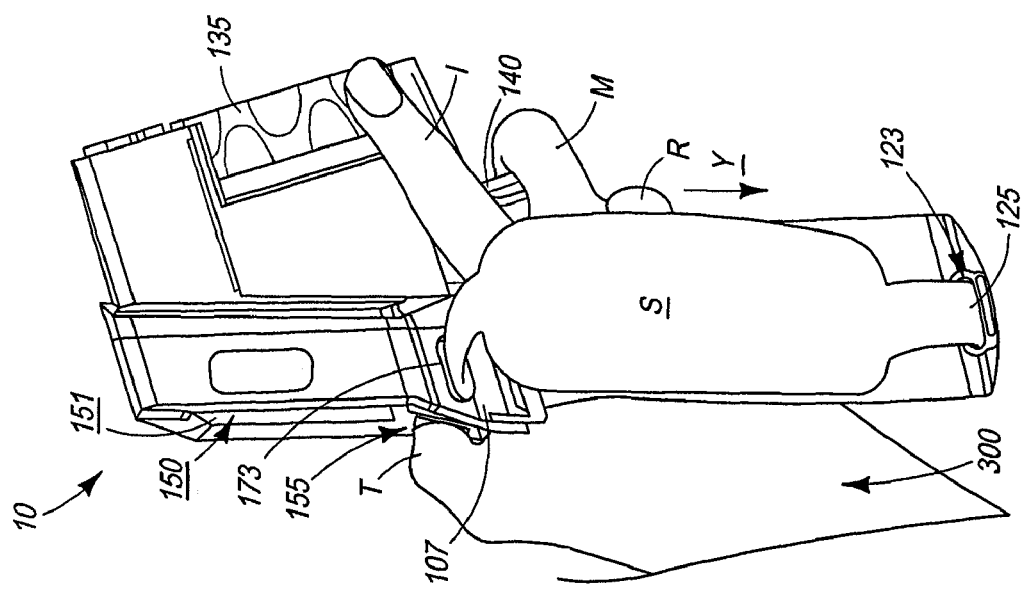

With further reference to FIGS. 3A-B, single-handed support of camera 10 may be appreciated; an area of hand 300, which is between thumb T and index finger I, may be seen abutting second shoulder 107, and another finger of hand 300 may be seen abutting first shoulder 106. FIG. 3A further illustrates a strap S that provides additional support for a right hand of a user to single-handedly handle and operate camera 10. Strap S is shown having an upper portion coupled to a first strap securing member 173, which is located along camera portion 110 of the housing, and a lower portion coupled to a lower strap securing member 125, which is formed in proximity to terminal end 123 of handle portion 120 of the housing. With reference back to FIGS. 1A and 1E, first strap securing member 173 is shown as a loop located on third side 113 of camera portion 110 of the housing. According to some preferred embodiments of the present invention, a second strap securing member 174, seen in FIGS. 1B and 1E, is located on fourth side 114 of camera portion 110 of the housing, opposite first strap securing member 173, so that strap S may be coupled to an opposite side of the housing, via second securing member 174 and lower strap securing member 125 of handle portion 120, in order to support left-handed handling and operation, from the opposite side to that shown in FIGS. 3A-B.

In the foregoing detailed description, the invention has been described with reference to specific embodiments. However, it may be appreciated that various modifications and changes can be made without departing from the scope of the invention as set forth in the appended claims.

We claim:

1. A thermal imaging camera comprising:
    a housing including a camera portion extending along a first axis, from a first side of the camera portion to a second side of the camera portion, the second side being opposite the first side, a shoulder extending under the second side of the camera portion, and a handle portion extending from a bottom side of the camera portion to a terminal end of the handle portion, the handle portion further extending away from the first side of the camera portion, along a second axis that is at an angle with respect to the first axis, the handle portion accommodating wrapping of a hand thereabout to support single-handed holding and operation of the camera;
    a thermal imaging assembly mounted within the camera portion of the housing;
    a focusing assembly mounted to the first side of the camera portion of the housing, the focusing assembly including a ring having a surface located to provide an interface for an index finger of the hand, when the hand is wrapped about the handle portion of the housing such that an area of the hand between a thumb of the hand and the index finger abuts the shoulder of the housing, the surface of the ring of the focusing assembly extending from a top point thereof, 360° around the first axis; and
    a display mounted to the second side of the camera portion of the housing;
    wherein a distance that wraps over a surface of the housing from a midpoint of the handle portion to both of a first point on the surface of the ring and a second point on the surface of the ring is no greater than approximately 4.5 inches;
    the first point is located between 90° and 180° from the top point of the ring;
    the second point is located between 180° and 270° from the top point of the ring; and
    the midpoint of the handle is located beneath the shoulder of the housing.

2. The camera of claim 1, further comprising a trigger for image capture mounted to the housing beneath the ring of the focusing assembly, the trigger being located for a middle finger of the hand to activate, when the index finger is positioned on the surface of the ring.

3. The camera of claim 1, further comprising a trigger for image capture mounted to the housing beneath the ring of the focusing assembly; and wherein the imaging assembly is mounted in the camera portion of the housing such that a center of gravity of the camera is located in proximity to the second axis, between the trigger and the shoulder of the housing.

4. The camera of claim 1, further comprising a trigger for image capture mounted to the housing beneath the ring of the focusing assembly, the trigger being located for either of the index finger and a middle finger of the hand to activate, when the hand is wrapped about the handle portion of the housing such that an area of the hand between a thumb of the hand and the index finger abuts the shoulder of the housing.

5. The camera of claim 1, further comprising a display control member mounted to the camera portion of the housing in proximity to the display, the display control member providing for all adjustments of the display and being positioned for a thumb of the hand to activate, when the index finger is positioned on the surface of the ring of the focusing assembly.

6. The camera of claim 5, wherein the display control member comprises a plurality of buttons.

7. The camera of claim 1, wherein the hand is either of: a left hand and a right hand.

8. The camera of claim 1, wherein the housing further includes a projecting sidewall that extends from the first side of the camera portion of the housing and beyond the ring of the focusing assembly.

9. The camera of claim 8, further comprising:
    a trigger for image capture mounted to the housing beneath the ring of the focusing assembly, the trigger being located for a finger of the hand to activate, when the hand is wrapped about the handle portion of the housing; and wherein the projecting sidewall of the housing extends between the trigger and the ring of the focusing assembly.

10. The camera of claim 8, wherein:
the camera portion of the housing further includes a top side, the top side being opposite the bottom side; and
the projecting sidewall of the housing extends from the first side of the camera portion and beyond the ring of the focusing assembly in proximity to the top side of the camera portion of the housing.

11. The camera of claim 8, wherein:
the ring of the focusing assembly includes a first edge, in proximity to the first side of the camera portion of the housing, and a second edge, opposite the first edge, and the surface that provides the interface for the index finger extends between the first and second edges; and
the projecting sidewall of the housing includes a frontal extension extending over the second edge of the ring of the focusing assembly.

12. The camera of claim 8, wherein:
the projecting sidewall extends from the first side of the camera portion of the housing and beyond the ring of the focusing assembly in proximity to the bottom side of the camera portion;
the camera portion of the housing further includes a top side and another projecting sidewall, the top side being opposite the bottom side; and
the other projecting sidewall of the housing extends from the first side of the camera portion and beyond the ring of the focusing assembly in proximity to the top side of the camera portion of the housing.

13. The camera of claim 12, wherein the housing further includes a frontal extension extending between the projecting sidewalls.

14. The camera of claim 8, further comprising a visible light camera module mounted within the projecting sidewall.

15. The camera of claim 8, further comprising a lens cap pivotably mounted to the projecting sidewall of the housing to be opened and closed over the lens of the focusing assembly.

16. The camera of claim 1, wherein the focusing assembly further includes a lens; and further comprising a lens cap pivotably mounted to the housing to be opened and closed over the lens of the focusing assembly.

17. The camera of claim 16, wherein the housing includes a feature to secure the lens cap in an open position.

18. The camera of claim 16, wherein the housing includes a feature to secure the lens cap in a closed position.

19. The camera of claim 16, further comprising a visible light camera module mounted within the housing and wherein the lens cap is mounted to also be opened and closed over an aperture for the visible light camera module.

20. A thermal imaging camera comprising:
a housing including a camera portion extending along a first axis, from a first side of the camera portion to a second side of the camera portion, the second side being opposite the first side, a projecting sidewall, and a handle portion extending from a bottom side of the camera portion to a terminal end of the handle portion, the handle portion further extending away from the first side of the camera portion, along a second axis that is at an angle with respect to the first axis, the handle portion accommodating wrapping of a hand thereabout;
a thermal imaging assembly mounted within the camera portion of the housing; and
a focusing assembly mounted to the first side of the camera portion of the housing, the focusing assembly including a lens and a ring mounted around the lens, the ring having a surface to provide an interface for an index finger of the hand, when the hand is wrapped about the handle portion of the housing;
wherein the projecting sidewall of the housing extends from the first side of the camera portion of the housing and beyond the ring of the focusing assembly.

21. The camera of claim 20, further comprising:
a trigger for image capture mounted to the housing beneath the ring of the focusing assembly, the trigger being located for a finger of the hand to activate, when the hand is wrapped about the handle portion of the housing; and
wherein the projecting sidewall of the housing extends between the trigger and the ring of the focusing assembly.

22. The camera of claim 20, wherein:
the camera portion of the housing further includes a top side, the top side being opposite the bottom side; and
the projecting sidewall of the housing extends from the first side of the camera portion and beyond the ring of the focusing assembly in proximity to the top side of the camera portion of the housing.

23. The camera of claim 20, wherein:
the ring of the focusing assembly includes a first edge, in proximity to the first side of the camera portion of the housing, and a second edge, opposite the first edge, and the surface that provides an interface for the index finger extends between the first and second edges; and
the projecting sidewall of the housing includes a frontal extension extending over the second edge of the ring of the focusing assembly.

24. The camera of claim 20, wherein:
the projecting sidewall extends from the first side of the camera portion of the housing and beyond the ring of the focusing assembly in proximity to the bottom side of the camera portion;
the camera portion of the housing further includes a top side and another projecting sidewall, the top side being opposite the bottom side; and
the other projecting sidewall of the housing extends from the first side of the camera portion and beyond the ring of the focusing assembly in proximity to the top side of the camera portion of the housing.

25. The camera of claim 24, wherein the housing further includes a frontal extension extending between the projecting sidewalls.

26. The camera of claim 20, further comprising a visible light camera module mounted within the projecting sidewall.

27. The camera of claim 20, further comprising a lens cap pivotably mounted to the projecting sidewall of the housing to be opened and closed over the lens of the focusing assembly.

28. The camera of claim 20, wherein:
the camera portion of the housing further includes a third side, extending between the first side and the second side, a fourth side, opposite the third side, extending between the first side and the second side, a top side, extending between the first side and the second side, and a bottom side, opposite the top side, extending between the first side and the second side; and further comprising:
a lower strap securing member located in proximity to the terminal end of the handle portion of the housing;
a first strap securing member located along the third side of the camera portion of the housing, for use in conjunction with the lower strap securing member in order to reversibly fasten a strap alongside the handle portion; and
a second strap securing member located along the fourth side of the camera portion of the housing, for use in conjunction with the lower strap securing member in order to reversibly fasten the strap alongside the handle portion.

29. The camera of claim 28, wherein:
the housing further includes a first shoulder extending under the first side of the camera portion, between the camera portion and the handle portion, and a second shoulder extending under the second side of the camera portion, between the camera portion and the handle portion; and
an area of the hand between a thumb of the hand and the index finger abuts the second shoulder of the housing and another finger of the hand abuts the first shoulder of the housing, when the index finger is positioned to activate the focusing assembly and the hand is wrapped about the handle portion of the housing.

30. The camera of claim 29, further comprising a trigger for image capture mounted to the housing beneath the focusing assembly; and wherein the imaging assembly is mounted in the camera portion of the housing such that a center of gravity of the camera is located in proximity to the second axis, between the trigger and the second shoulder of the housing.

31. The camera of claim 28, further comprising:
a display mounted to the second side of the camera portion of the housing; and
a display control member mounted to the camera portion of the housing in proximity to the display, the display control member being positioned for a thumb of the hand to activate when the index finger of the hand is positioned for activating the focusing assembly and the hand is wrapped about the handle portion of the housing.

32. A thermal imaging camera comprising:
a housing including a camera portion extending along a first axis, from a first side of the camera portion to a second side of the camera portion, the second side being opposite the first side, and a handle portion extending from a bottom side of the camera portion to a terminal end of the handle portion, the handle portion further extending away from the first side of the camera portion, along a second axis that is at an angle with respect to the first axis, the handle portion accommodating wrapping of a hand thereabout;
a thermal imaging assembly mounted within the camera portion of the housing;
a focusing assembly mounted to the first side of the camera portion of the housing, the focusing assembly including a lens and a ring, the ring having a surface providing an interface for an index finger of the hand, when the hand is wrapped about the handle portion of the housing;
a lens cap pivotably mounted to the housing to be opened and closed over the lens of the focusing assembly; and
a visible light camera module mounted within the housing and wherein the lens cap is mounted to also be opened and closed over an aperture for the visible light camera module.

33. The camera of claim 32, wherein the housing includes a feature to secure the lens cap in an open position.

34. The camera of claim 32, wherein the housing includes a feature to secure the lens cap in a closed position.

35. A thermal imaging camera comprising:
a housing including a camera portion, a handle portion, a first shoulder and a second shoulder, the camera portion of the housing extending along a first axis, from a first side of the camera portion to a second side of the camera portion, the second side being opposite the first side, the first shoulder extending under the first side of the camera portion of the housing, between the camera portion and the handle portion, the second shoulder extending under the second side of the camera portion, between the camera portion and the handle portion, and the handle portion extending from a bottom side of the camera portion to a terminal end of the handle portion and further extending away from the first side of the camera portion, along a second axis that is at an angle with respect to the first axis, the handle portion accommodating wrapping of a hand thereabout;
a focusing assembly mounted to the first side of the camera portion of the housing, the focusing assembly including a ring having a surface located to provide an interface for an index finger of the hand;
a trigger for image capture mounted to the housing beneath the ring of the focusing assembly such that the first shoulder of the housing extends just beneath the trigger; and
a thermal imaging assembly mounted within the camera portion of the housing;
wherein, when the hand is wrapped around the handle portion of the housing so that an area of the hand between a thumb of the hand and the index finger abuts the second shoulder of the housing, the index finger reaches the surface of the ring of the focusing assembly; and
when the hand is wrapped around the handle portion of the housing so that the area of the hand between the thumb and the index finger abuts the second shoulder of the housing and another finger of the hand abuts the first shoulder of the housing, the camera is balanced in the hand.

36. The camera of claim 35, wherein the angle between the first and second axes is approximately 105 degrees.

37. The camera of claim 35, further comprising:
a display mounted to the second side of the camera portion of the housing; and
wherein a viewing surface of the display extends approximately parallel to the second axis.

* * * * *